Patented Sept. 9, 1930

1,775,587

UNITED STATES PATENT OFFICE

JÜRGEN CALLSEN, OF ELBERFELD, GERMANY, ASSIGNOR TO WINTHROP CHEMICAL COMPANY, INC., OF NEW YORK, N. Y., A CORPORATION OF NEW YORK

NEW WATER-SOLUBLE CARBONATES FROM β-TRIBROMOETHYLALCOHOL

No Drawing. Application filed April 15, 1929, Serial No. 355,423, and in Germany April 28, 1928.

The present invention relates to new water-soluble carbonates from β-tribromoethylalcohol.

I have found that easily water-soluble carbonates from β-tribromoethylalcohol are obtainable by transforming the latter into salts of its mixed carbonates with alkyl-substituted aminoalcohols. The reaction may be performed, for instance, by reacting upon chloroformic acid- β-tribromoethylester (obtainable by treating β-tribromoethylalcohol with phosgene in the presence of dimethylaniline) with an aliphatic alkyl-substituted aminoalcohol according to the usual methods for preparing such mixed carbonates. The hydrochloric acid salts of the new compounds thus obtainable, which in their free form probably correspond to the formula:

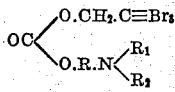

wherein R means an alkylene group (—CH$_2$— —C$_2$H$_4$— and the like) and R$_1$ and R$_2$ stand for alkyl groups, can be transformed into other salts, for instance by dissolving the same in water, liberating the base by the addition of an alkali and reacting upon the free base with a suitable organic or inorganic acid, such as acetic acid, hydrobromic acid, sulfuric acid, nitric acid and the like, in the usual manner.

The products thus obtainable form colorless crystals, soluble in water and alcohol, nearly insoluble in ether and exerting valuable narcotic properties. Especially the hydrochloric acid salts of the compounds of the probable formula:

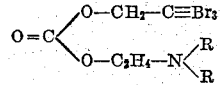

wherein R means the methyl- or ethyl group, were found to be valuable media for rectal anesthesia.

Compared with β-tribromoethylalcohol as rectal anesthetic, they have the great advantage of being easily soluble in water without decomposition, whereas the former is difficultly soluble in cold water and decomposes, when heating its aqueous solution.

The following example illustrates my invention, without limiting it thereto, the parts being by weight:

*Example.*—345.5 parts of tribromoethyl-chlorocarbonate (colorless liquid boiling at 103° C. at a pressure of 10 mm., being obtainable by reacting upon β-tribromoethylalcohol with phosgene in the presence of dimethylaniline in the usual manner) are dissolved in 5000 parts of benzene. To this solution 89 parts of dimethylaminoethanol are added, while cooling. The reaction product soon begins to separate in a crystalline form. After some hours the reaction mixture is filtered and the residue is recrystallized from hot alcohol. The hydrochloric acid salt of tribromoethyldimethylaminoethylcarbonate of the probable formula:

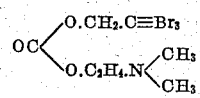

thus obtainable forms colorless crystals, melting at 184° C., easily soluble in water and more difficultly soluble in hot alcohol. The compound can be transformed into other salts, for instance, by liberating the base by means of potassium carbonate and adding hydrobromic acid, acetic acid or the like, or also by double decomposition, for instance with silver nitrate, whereby a well crystallizing nitric acid salt of the base is formed.

When replacing in the above example the dimethylaminoethanol by another alkylaminoalcohol, for instance diethylaminoethanol, compounds of similar properties will be obtained.

I claim:

1. As new products salts of the compounds of the probable general formula:

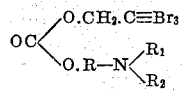

wherein R means an alkylene group, R$_1$ and R$_2$ stand for alkyl groups, said products forming colorless crystals, soluble in water and alcohol, nearly insoluble in ether, and exerting valuable narcotic properties.

2. As new products the hydrochloric acid salts of the compounds of the probable general formula:

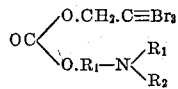

wherein R means an alkylene group, $R_1$ and $R_2$ stand for alkyl groups, said products forming colorless crystals, soluble in water and alcohol, nearly insoluble in ether, and exerting valuable narcotic properties.

3. As new products the hydrochloric acid salts of the compounds of the probable general formula:

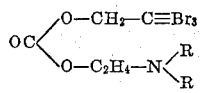

wherein R means the methyl- or ethyl group, said products forming colorless crystals, easily soluble in water, more difficultly soluble in hot alcohol, and exerting valuable narcotic properties.

In testimony whereof I have hereunto set my hand.

JÜRGEN CALLSEN.